United States Patent [19]

McDaniel

[11] 4,382,022
[45] May 3, 1983

[54] SILICA HAVING TITANIUM INCORPORATED THROUGH USE OF PEROXIDE

[75] Inventor: Max P. McDaniel, Bartlesville, Okla.

[73] Assignee: Phillips Petroleum Company, Bartlesville, Okla.

[21] Appl. No.: 324,886

[22] Filed: Nov. 25, 1981

[51] Int. Cl.$^3$ .................. B01J 21/06; B01J 23/26; B01J 37/00
[52] U.S. Cl. .................................... 252/452; 252/458
[58] Field of Search .............. 252/452, 458, 461, 469; 423/335, 337, 598, 613

[56] References Cited

U.S. PATENT DOCUMENTS

| | | | |
|---|---|---|---|
| 1,806,690 | 5/1931 | Kröner et al. | 423/335 |
| 2,311,917 | 2/1943 | Wainer et al. | 423/598 |
| 2,895,920 | 7/1959 | Janoski | 252/452 |
| 3,182,048 | 5/1965 | Mills | 252/472 X |
| 3,459,736 | 8/1969 | Dalibor | 252/461 X |
| 4,119,569 | 10/1978 | Dietz | 252/452 |

Primary Examiner—Carl F. Dees

[57] ABSTRACT

A silica composition having a high concentration of titanium is produced by solubilizing a titanium compound by combining same with a peroxide such as hydrogen peroxide. In a preferred embodiment, the peroxide is combined with the acid typically used in producing a gel from the combination of a silicate solution and an acid although the solubilizing component can also be used to simply impregnate particulate silica. The resulting composition has a high titanium content and an unusual pore structure makes it ideally suited as a catalyst base. When contemplated as a catalyst base, chromium can simply be coprecipitated with the silica and titanium. The resulting catalyst is ideally suited for the polymerization of olefins under slurry conditions.

20 Claims, No Drawings

SILICA HAVING TITANIUM INCORPORATED THROUGH USE OF PEROXIDE

BACKGROUND OF THE INVENTION

This invention relates to silica-titanium compositions.

Supported chromium oxide catalysts can be used to prepare olefin polymers in a hydrocarbon solution to give a product having excellent characteristics from many standpoints. Supported chromium oxide catalysts can be used to prepare olefin polymers in a slurry system when the polymer is produced in the form of small particles of solid materials suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature would cause the polymer to go into solution and thus destroy the slurry or particle-form process.

It is known that titanium has an effect on chromium polymerization catalysts which effect is generally beneficial. Consequently, silica-titania supports for chromium catalysts have found commercial utility. Generally, in such systems, the titanium content is relatively low, generally about 2 percent, in part because it is very difficult to achieve higher loadings of titanium, with about 5.5 percent being the maximum that can be easily incorporated by conventional means. It is further known that in general there are techniques which can be used to increase pore volume which is generally desirable. These generally tend to also increase surface area which is generally undesirable, i.e., it would be more desirable to achieve higher pore volume through larger pores.

SUMMARY OF THE INVENTION

It is an object of this invention to provide a silica-titania catalyst support having a high pore volume but relatively low surface area;

It is a further object of this invention to provide a catalyst capable of giving high melt flow polymer;

It is a further object of this invention to provide a catalyst suitable for use in slurry polymerization systems;

It is yet a further object of this invention to provide an improved method of producing chromium-containing catalysts; and It is yet a further object of this invention to provide a silica which contains a relatively high loading of titanium.

In accordance with this invention a titanium compound is reacted with a peroxide to give a more soluble titanium compound for use in forming titanium-containing silica.

DESCRIPTION OF THE PREFERRED EMBODIMENTS

There are two embodiments of this invention. In the first, an aqueous alkali metal silicate and an aqueous mineral acid containing a titanium compound are reacted to form a cogel, the improvement residing in the reaction of the titanium compound with a peroxide to form a more soluble titanium component entity. In an alternative embodiment, the titanium compound is reacted with a peroxide to give a soluble titanium complex which is then aqueously impregnated into silica.

In the first embodiment, the cogel is formed in a manner known in the art by adding a titanium compound to a mineral acid and combining with an alkali metal silicate preferably by adding the silicate to the acid so as to form a hydrogel. The hydrogel is then aged for a time of greater than one hour, washed to produce a substantially alkali metal free hydrogel and thereafter water removed to form a xerogel. Generally, this is done by contacting with a normally liquid oxygen-containing volatile water miscible organic compound to remove water and to produce a xerogel. However, conventional drying techniques such as spray drying, tray drying or oven drying can also be used. Such cogel formation is broadly shown in Dietz, U.S. Pat. No. 3,887,494, the disclosure of which is hereby incorporated by reference. In accordance with this invention, a peroxide is included with the acid and titanium compound in order to produce a more soluble titanium entity. While applicant does not wish to be bound by theory, the resulting titanium compound is believed to be a $TiO_2^{+2}$. The peroxide is generally simply hydrogen peroxide although any water soluble peroxide which will safely oxidize a titanium salt to $TiO_2^{+2}$ can be utilized. Other suitable peroxides include sodium peroxide and potassium peroxide. Alkali metal peroxides are less preferred because more metal ion is introduced which has to be washed out. A suitable titanium compound can be any titanium compound which will react with the peroxide to give us a water soluble complex. Generally, titanium compounds of the type normally used in cogel preparations, such as titanyl sulfate ($TiOSO_4$) are used. Other suitable titanium compounds include titanium tetrachloride, titanium nitrate and titanium tetraalkoxides. It is possible to get titanium compounds such as titanyl sulfate into solution by using large amounts of acid but in these acid solutions the titanium concentration is thus relatively low. This produces problems with neutralizing the large amount of acid present. Furthermore, the dilution results in a lower pore volume, poor quality silica. Also, the greater the acid content the more by-product Na+ that has to be washed out. In accordance with this invention, the titanium concentration in the acid can be 5 to 40, preferably 10 to 20 weight percent titanium based on the total weight of titanium and acid. Thus silica xerogels with a typical pore volume of 2 to 3 cc/g can be produced even with a high level of titanium and yet have a surface area of less than the 300 to 400 m$^2$/g which is typical for high pore volume silica, and can even be less than 200 m$^2$/g. Similarly, the average pore diameter can be greater than the 200 to 300 angstroms which is typical, indeed can be greater than 400 angstroms or even greater than 600 angstroms at said 2 to 3 cc/g pore volume.

The reference to producing a silica-titania cogel herein is meant to include as a silica-containing material either catalytic grade silica, silica-alumina, silica-boria, silica-zirconia or mixtures thereof in which the silica constitutes 80 to 100 percent, preferably greater than 90 percent of the silica-containing material exclusive of the titanium component. Sufficient titanium is utilized to provide in the final dried silica (xerogel) from 2 to 30 weight percent, preferably from 6 to 15 weight percent titanium based on the weight of the xerogel.

The titanium complexes have a tendency to precipitate at a somewhat higher pH which can be obtained by utilizing a small amount of base such as ammonia or ammonium hydroxide after the combination of the acid and the silicate if a precipitate does not occur spontaneously. Alternatively, ions such as iron ions can be added to induce precipitation.

In accordance with the second embodiment of this invention, a titanium compound of the same scope used in embodiment one is reacted with a peroxide of the same scope used in embodiment one to produce a water soluble titanium component. The resulting water soluble titanium component is then impregnated onto a silica-containing material. The silica-containing material can be selected from catalytic grade silica, silica-alumina, silica-boria, silica-zirconia, mixtures thereof or even a silica-titania. The aqueous titanium complex can be either introduced to the silica-containing material while the silica-containing material is in the hydrogel stage and then the water removed in the normal manner such as azeotropic distillation or washing with a water soluble volatile organic compound as described above or spray drying or the solution can be impregnated onto silica xerogel or silica xerogel containing a chromium compound. In the case of a silica xerogel, ordinary silica xerogel made by conventional drying techniques, such as spray drying, tray drying, oven drying, and other conventional means can be utilized. The particulate silica is simply slurried with the aqueous solution of the titanium complex and thereafter the water evaporated.

The catalyst produced in accordance with this invention contains in addition to the silica component and the titanium component, a chromium component. The chromium component can be included in the reactants, generally in the acid so as to form a silica-titania-chromium tergel in the first embodiment or a silica-chromium coprecipitated gel in the second embodiment. Suitable chromium compounds include ammonium chromate, ammonium acetate, ammonium nitrate, and chromium trioxide, for instance. Alternatively, a water soluble chromium compound as described above can be added to the hydrogel stage. It is also possible to utilize an aqueous solution of a chromium compound of the type described above or a nonaqueous solution of a chromium compound such as tertiary butylchromate, bisarene chromium compounds, or chromium acetylacetonate to impregnate the xerogel.

A chromium compound is used in an amount to give from 0.001 to 10, preferably 0.1 to 5, more preferably 0.5 to 5 weight percent chromium based on the weight of the final activated or calcined support.

The final composite including the titanium compound and the chromium is activated for polymerization by calcination in an oxygen-containing atmosphere at an elevated temperature which is generally 500° to 1000°, preferably 600° to 800° C. and for a time of at least 5 minutes, preferably 0.5 to 24 hours, more preferably 1 to 4 hours. Activation can be carried out solely by calcination in dry air, for example, or it can be accomplished sequentially in a reducing atmosphere such as that provided by carbon monoxide and then air as disclosed in McDaniel et al., U.S. Pat. No. 4,151,122, the disclosure of which is hereby incorporated by reference. Temperatures of 700° to 925° C., for instance can be used for this reducing treatment.

Polymerization using the catalyst produced in accordance with this invention is preferably carried out under slurry or particle form conditions as disclosed for instance in Norwood, U.S. Pat. No. 3,248,179, issued Apr. 26, 1966, the disclosure of which is hereby incorporated by reference. Briefly, this can be accomplished, for example, by conducting the polymerization in the presence of a dry inert hydrocarbon diluent such as isobutane, n-heptane, methylcyclohexane or benzene at a reactor temperature within the range of about 60° to about 110° C. and a reactor pressure of about 1.7 to about 4.1 MPa (250 to 600 psia). The polymer can be recovered, treated with $CO_2$ or $H_2O$, for example, to deactivate residual catalysts, stabilized with an antioxidant, such as butylated hydroxytoluene (BHT), and dried by conventional methods to obtain the final product. Hydrogen can be used in the reactor as known in the art to provide some control of the molecular weight of the polymer. The polymerization can be conducted batchwise in a stirred reactor or continuously in a loop reactor with or without a settling leg or in a series of reactors. If desired, these catalysts can be used in solution or other conventional polymerization systems such as gas phase polymerization but their ability to produce higher melt flow polymer is of primary importance in slurry systems.

The catalyst of this invention is suitable for the production of normally solid ethylene homopolymer and also for the production of predominantly ethylene copolymer using as the monomer predominantly ethylene. Ethylene can be copolymerized with one or more higher aliphatic mono-1-olefins containing from 3 to about 10 carbon atoms per molecule such as propylene, 1-butene, 1-pentene, 1-hexene, 1-octene, and/or a conjugated diolefin containing 4 to about 12 carbon atoms in any proportion. In such polymers, the ethylene content generally ranges from about 97 to 99.6 weight percent which is obtained using from about 93 to 99.6 weight percent ethylene monomer, the remainder being said higher olefin comonomer. More broadly, ethylene copolymers can be made using 80 to 99.8 weight percent ethylene and 20 to 0.2 weight percent comonomer in the feed.

EXAMPLE I

A series of catalysts was prepared in accordance with embodiment 1 by adding sufficient $H_2O_2$ to $TiOSO_4$ contained in water to produce a solution containing the bright orange $TiO_2^{+2}$ complex to which was added $H_2SO_4$. Aqueous sodium silicate was then slowly added to the stirred acid solution until the acid was nearly neutralized. Then the remaining acid was neutralized to allow gellation to occur by adding a base such as ammonium hydroxide. The gel was aged at about 160° to 180° F. (71° to 82° C.) for about 20 to 48 hours and the aged gel washed batchwise with 9 portions of deionized water to remove most of the soluble by-products such as the sodium ions. The amount of $Na^+$ remaining in the washed hydrogel was estimated to be less than about 0.1 weight percent based on previous work in this area. Water was essentially removed from the hydrogel by azeotrope distillation with ethyl acetate as is known in the art.

Catalysts were prepared from the resulting dried gels by first calcining each one in air at the designated temperature, 1400° F., 1500° F. or 1600° F. (760°, 816°, or 871° C.) for 5 hours, recovering the cooled product, slurrying it in n-hexane and admixing it with sufficient t-butyl chromate to provide about 1 weight percent Cr, based on the final activated composite consisting of chromium oxide supported on silica-titania. Activation of each catalyst was accomplished by calcination in air for 3 hours at the specified temperature.

Specifically, the silica-titania support for catalyst 1 was prepared as follows: To 430 g of a $TiOSO_4 \cdot H_2SO_4$ mixture, equivalent to 14 weight percent Ti, contained in deionized water was added 250 mL of 30% $H_2O_2$ to give a final volume of 1900 mL. The titanium compound dissolved forming the bright orange $TiO_2^{+2}$ complex. 220 mL of the orange solution, containing the calculated equivalent of 7 g Ti, was mixed with 143 mL of the water and 30 mL (55 g) of 96 percent $H_2SO_4$. To the stirred mixture was slowly added 209 mL of a sodium silicate solution, weight ratio of $SiO_2/Na_2O$ of 3.22, density of 1.205 g/cc, 15.8 weight percent $SiO_2$, until nearly all of the acid was neutralized. Gellation was accomplished at 7 percent solids by adding a few mL of ammonium hydroxide solution. The hydrogel was aged over the weekend (about 48 hours) at about 160° to 180° F., washed nine times with portions of deionized water to reduce the sodium ion content to less than about 0.1 weight percent (based on the dry gel) and substantially freed of water by azeotrope distillation with ethyl acetate, each step of which is well known in the prior art.

A portion of the dried gel was calcined in a fluidized bed with 42 L/hr of dry air for 3 hours at 1400° F. The recovered, cooled product was then slurried in n-hexane and mixed with sufficient t-butyl chromate to provide 1 weight percent Cr as previously descirbed. The composite was activated for polymerization by calcination in a fluidized bed with dry air for 3 hours at 500° F. (260° C.).

The silica-titania support for catalyst 2 was prepared in a variation of the preceding example by adding enough of the $TiOSO_4 \cdot H_2SO_4$ mixture to equal 8 g of $TiO_2$ to about 10 mL of 30 percent $H_2O_2$ and 250 mL of water. The orange solution was then mixed with 176 mL of about 0.15 molar $H_2SO_4$ solution and to the stirred mixture was slowly dripped into 167 mL of the previously described sodium silicate solution. The remaining small amount of acid was neutralized by the addition of solid $NaHCO_3$ powder to allow gellation to occur at a solids level of 6 percent. The hydrogel was aged for 22 hours at 160° to 180° F., then washed, dried, calcined, impregnated with t-butyl chromate and activated as before.

The silica-titania supports for catalysts 3 to 6 were prepared in a similar fashion to that described for catalyst 1 except that the Ti contents were changed and the solids level at gellation was 6 percent rather than 7 percent and aging times of 20 to 24 hours were used. The calculated $TiO_2$ (Ti) contents, and the determined surface areas, pore volumes, and average pore diameters of the catalysts are described below in Table I along with the calcining and activation temperatures employed in their preparation.

Another catalyst support (no. 7) was prepared by mixing 275 mL of surplus orange $TiOSO_4$-$H_2O_2$-$H_2O$ solution employed in preparing the support for catalyst 1 with 123 mL of the sodium silicate solution and 37 mL of $H_2O$ to obtain an orange solution. Into the stirred orange solution was dripped 1000 mL of 28 percent ammonium hydroxide and 1000 mL of $H_2O$ to produce a hydrogel. The hydrogel was aged for 20 to 24 hours, washed and calcined at 1400° F. as before to obtain a zerogel. This support was not treated with Cr to form a catalyst.

The calculated $TiO_2$ (Ti) contents of the catalysts in terms of weight percent and the BET determined properties of surface area, pore volume and average pore diameter are given in Table I.

TABLE I

| Catalyst No. | Catalyst Properties | | | | | | |
|---|---|---|---|---|---|---|---|
| | 1 | 2 | 3 | 4 | 5 | 6 | 7 |
| Wt. % $TiO_2$ (Ti) | 20 (12) | 20 (12) | 5 (3) | 10 (6) | 25 (15) | 35 (21) | 35 (21) |
| Surface Area, $m^2/g$ | 138 | 372 | 331 | 365 | not determined | | 378 |
| Pore Volume, cc/g | 2.8 | 2.7 | 2.4 | 1.9 | not determined | | 2.8 |
| Average Pore Diameter Angstroms | 812 | 275 | 290 | 208 | not determined | | 294 |
| in. × $10^{-8}$ | 8.12 | 2.75 | 2.90 | 2.08 | not determined | | 2.94 |

The results indicate that the incorporation of a wide range of titanium levels can be readily achieved by following the method of the invention. The combination of low surface area, high pore volume and large average pore diameter as illustrated by catalyst 1 is considered to be unusual. Generally, high pore volume, e.g. 2.7 to 2.8, is associated with a surface area of about 300 to 400 $m^2/g$ and an average pore diameter of about 200 to 300 angstroms. It is believed the unusual results for catalyst 1 stem from forming the hydrogel in relatively concentrated conditions (as opposed to catalyst 2 support where gellation occurs in more dilute conditions) coupled with the particular 20 weight percent $TiO_2$ level used.

Although similar conditions are employed in forming the supports of catalysts 3 to 6, the effect of employing different levels of the $TiO_2^{+2}$ complex appear to result in catalysts having lowered pore volumes and pore diameters coupled with higher surface areas. Generally, large pore diameter and high pore volume catalysts are considered to be desirable for particle form ethylene polymerization since their polymer melt index capability is higher than for catalysts having smaller pore diameters.

EXAMPLE II

A sample of each activated catalyst was employed in the particle form polymerization of ethylene in a stirred one gallon (3.8 L) autoclave in the presence of 1.25 lbs (567 g) isobutane diluent at a pressure of about 565 psia (3.62 MPa) and at the specified reaction temperature, 212° F. (100° C.) or 230° F. (110° C.). The reaction was terminated by venting diluent and ethylene. The polymer was recovered, dried and stabilized with a conventional antioxidant and the melt flow properties determined in accordance with ASTM D 1238, Condition E, melt index (MI) and Condition F, high load melt index (HLMI).

The results are presented in Table II.

TABLE II

| Catalyst No. | 1 | 2 | 2 | 3 | 4 | 4 | 5 | 6 |
|---|---|---|---|---|---|---|---|---|
| Ethylene Polymerization | | | | | | | | |
| Wt. %, Ti | 12 | 12 | 12 | 3 | 6 | 6 | 15 | 21 |
| Support Calcining Temp. °F. | 1400 | 1400 | 1400 | 1500 | 1500 | 1500 | 1500 | 1600 |
| Catalyst Activation Temp. °F. | 500 | 500 | 1500 | 1500 | 500 | 1500 | 1600 | — |
| Reaction Temp. °F. | 212 | 212 | 230 | 230 | 212 | 230 | 230 | 230 |
| Run Time, Minutes | 140 | 80 | 95 | 72 | 80 | 72 | 180 | Dead |
| Catalyst Weight, g | 0.0647 | 0.0646 | 0.0437 | 0.0706 | 0.0674 | 0.2757 | 0.0857 | Dead |
| Productivity g polymer/g cat. | 2670 | 5080 | 5370 | 4900 | 3530 | 1400 | 1920 | Dead |
| MI | 67.6 | 6.1 | 1.6 | 2.9 | 28.8 | 3.7 | 1.7 | Dead |
| HLMI/MI | 48 | 88 | 61 | — | 56 | — | — | Dead |

It is observed that with low catalyst activation temperatures, e.g. 500° F., that reactor fouling is experienced with reaction temperatures exceeding 212° F.

Polyethylene of various melt indexes can be made with catalysts prepared according to this invention as the Table II results demonstrate. The effect of the extraordinary large pore diameter catalyst 1 containing 12 weight percent Ti is shown in the very high (67.6) melt index value for the polymer made.

Catalysts 4, 5 and 6 containing Ti ranging from 6 to 21 weight percent are found to be relatively inactive (4 and 5) and dead (6). The reason for this is the effect of the Ti content at the high activation temperatures which causes sintering of the catalyst. When sintering becomes excessive, as in catalyst 6, the pore structure is destroyed and a dead catalyst can result. Activation at a lower temperature, e.g. 1200° F. (649° C.), where sintering is avoided would result in an active catalyst with good productivity under the polymerization conditions set forth.

Similarly, catalyst 7 (if made and activated at about 1200° F.) would be expected to be active in ethylene polymerization.

EXAMPLE III

A catalyst was prepared by mixing 10 g of a commercially available catalyst containing about 1 weight percent chromium as chromium acetate supported on microspheroidal silica with a red-brown solution formed by dissolving 2.0 g of the $TiOSO_4 \cdot H_2SO_4$ mixture, previously used, in 10 mL of $H_2O_2$ and 50 mL of $H_2O$. The mixture was then dried to leave a green powder. The powder was activated for ethylene polymerization by calcining it for 5 hours at 1400° F. in dry air as described before.

A 0.0670 sample of the catalyst was employed in particle form polymerization of ethylene under the conditions described before except that a reaction temperature of 215° F. (102° C.) was used. A run time of 35 minutes was used and the productivity was determined to be 2800 g polymer per g catalyst. The melt index of the polymer was 0.06 and the HLMI/MI ratio was 125.

While this invention has been described in detail for the purpose of illustration, it is not to be construed as limited thereby but is intended to cover all the changes and modifications within the spirit and scope thereof.

I claim:

1. A method comprising combining a titanium compound, a peroxide, and a mineral acid to form a first solution;
   thereafter combining said first solution with a second solution comprising an alkali metal silicate;
   allowing gellation to occur;
   aging for a time of at least one hour;
   washing to remove alkali metal ions; and
   removing water to produce a xerogel.

2. A method according to claim 1 wherein a base is added after combination of said first and second solutions to effect said gellation.

3. A method according to claim 2 wherein said base is ammonium hydroxide and said water is removed by contacting the washed gel with ethyl acetate.

4. A method according to claim 3 wherein said peroxide is hydrogen peroxide, said silicate is sodium silicate, and said mineral acid is sulfuric acid and said titanium compound is titanyl sulfate.

5. A method according to claim 4 wherein the resulting xerogel has a pore volume of 2 to 3 cc/g and an average pore diameter as measured by nitrogen absorption of greater than 600 angstroms.

6. A method according to claim 5 wherein the resulting xerogel has a weight percent titanium content within the range of 6 to 15 based on the weight of said xerogel.

7. A method according to claim 1 wherein said peroxide is hydrogen peroxide, said silicate is sodium silicate, said acid is sulfuric acid and wherein said titanium compound is titanyl sulfate.

8. A method according to claim 1 wherein said water is removed by contacting the washed gel with a normally liquid volatile organic compound.

9. A method according to claim 1 for producing a catalyst wherein said xerogel contains in addition a chromium compound.

10. A method according to claim 1 for producing a catalyst wherein a chromium compound is present in said first solution so as to produce a silica-titanium-chromium tergel.

11. A method according to claim 1 for producing a catalyst wherein said titanium is present in an amount sufficient to give 6 to 15 weight percent titanium based on the weight of said xerogel, said peroxide is hydrogen peroxide, said silicate is sodium silicate, said acid is sulfuric acid, said titanium compound is titanyl sulfate, said water is removed by contacting the washed gel with a normally liquid volatile organic compound and said xerogel contains in addition a chromium compound.

12. A product produced by the method of claim 1.

13. A product produced by the method of claim 7.

14. A catalyst produced by the method of claim 9.

15. A catalyst produced by the method of claim 11.

16. A method for producing a catalyst comprising combining a mineral acid, a titanium compound and a peroxide to form a solution;

combining said solution with silica to form a treated silica composition, said composition containing in addition a chromium compound.

17. A method according to claim 16 wherein said silica is particulate silica.

18. A method according to claim 17 wherein said peroxide is hydrogen peroxide, said mineral acid is sulfuric acid, said titanium compound is titanyl sulfate and wherein titanium is present in an amount within the range of 6 to 15 weight percent based on the weight of said silica and said chromium compound is present in an amount sufficient to give chromium in an amount within the range of 0.5 to 5 weight percent based on the weight of said silica.

19. A catalyst produced by the method of claim 18.

20. A catalyst produced by the method of claim 16.